United States Patent
Runstedler et al.

(10) Patent No.: US 9,332,106 B2
(45) Date of Patent: **\*May 3, 2016**

(54) SYSTEM AND METHOD FOR ACCESS CONTROL IN A PORTABLE ELECTRONIC DEVICE

(71) Applicant: RESEARCH IN MOTION LIMITED, Waterloo (CA)

(72) Inventors: Christopher Runstedler, Waterloo (CA); Brian Groux, Waterloo (CA); Jonathan Cardy, Waterloo (CA)

(73) Assignee: BlackBerry Limited, Waterloo (CA)

( \* ) Notice: Subject to any disclaimer, the term of this patent is extended or adjusted under 35 U.S.C. 154(b) by 728 days.

This patent is subject to a terminal disclaimer.

(21) Appl. No.: 13/665,831

(22) Filed: Oct. 31, 2012

(65) Prior Publication Data
US 2013/0061317 A1    Mar. 7, 2013

Related U.S. Application Data

(63) Continuation of application No. 12/362,536, filed on Jan. 30, 2009, now Pat. No. 8,326,358.

(51) Int. Cl.
*H04M 1/00* (2006.01)
*H04M 1/673* (2006.01)
(Continued)

(52) U.S. Cl.
CPC ............. *H04M 1/673* (2013.01); *G06F 3/0233* (2013.01); *G06F 3/04883* (2013.01);
(Continued)

(58) Field of Classification Search
CPC . H04L 2209/34; H04L 9/0631; H04L 9/0822; H04L 9/0861; H04L 9/3226; H04L 63/0421; G06F 21/6209; G06F 21/46; G06F 17/30091; G06F 17/30864

USPC ........ 455/556.2, 550.1, 566, 575.1, 410, 411, 455/3.05, 418, 41.2; 340/5.54; 713/168, 713/182, 183, 184; 715/700, 702; 726/5, 726/18, 19
See application file for complete search history.

(56) References Cited

U.S. PATENT DOCUMENTS

| 3,872,433 A | 3/1975 | Holmes et al. |
| 5,261,009 A | 11/1993 | Bokser |

(Continued)

FOREIGN PATENT DOCUMENTS

| EP | 0844571 A2 | 5/1998 |
| EP | 1909161 A1 | 4/2008 |

(Continued)

OTHER PUBLICATIONS

Print out of http://courses.media.mit.edu/2004fall/mas622j/04.projects/students/VanKleek/, printed Apr. 27, 2009.

(Continued)

*Primary Examiner* — Shaima Q Aminzay
(74) *Attorney, Agent, or Firm* — Geoffrey deKleine; Borden Ladner Gervais LLP

(57) ABSTRACT

A method of access control in an electronic device includes monitoring for input at the electronic device, for each input determined to be one of a plurality of predefined gestures including gestures from a touch-sensitive input device or from a movement sensor, mapping the input to a respective Unicode character and adding the respective Unicode character to a passcode to provide an entered passcode, comparing the entered passcode to a stored passcode, and changing an access state at the electronic device if the entered passcode matches the stored passcode.

19 Claims, 10 Drawing Sheets

(51) Int. Cl.
*G06F 3/023* (2006.01)
*G06F 3/0488* (2013.01)
*G06F 21/31* (2013.01)
*G06F 21/32* (2013.01)
*G07C 9/00* (2006.01)

(52) U.S. Cl.
CPC ............ *G06F 21/31* (2013.01); *G06F 21/316* (2013.01); *G06F 21/32* (2013.01); *G07C 9/00142* (2013.01); *G06F 2221/2111* (2013.01); *G06F 2221/2153* (2013.01); *H04M 2250/22* (2013.01)

(56) References Cited

U.S. PATENT DOCUMENTS

| | | | |
|---|---|---|---|
| 5,832,528 | A | 11/1998 | Kwatinetz et al. |
| 6,002,390 | A | 12/1999 | Masui |
| 6,223,059 | B1 | 4/2001 | Haestrup |
| 6,226,299 | B1 | 5/2001 | Henson |
| 6,351,634 | B1 | 2/2002 | Shin |
| 6,421,453 | B1 | 7/2002 | Kanevsky et al. |
| 6,646,572 | B1 | 11/2003 | Brand |
| 7,098,896 | B2 | 8/2006 | Kushler et al. |
| 7,216,588 | B2 | 5/2007 | Suess |
| 7,277,088 | B2 | 10/2007 | Robinson et al. |
| 7,292,226 | B2 | 11/2007 | Matsuura et al. |
| 7,308,652 | B2 | 12/2007 | Comfort et al. |
| 7,382,358 | B2 | 6/2008 | Kushler et al. |
| 7,394,346 | B2 | 7/2008 | Bodin |
| 7,443,316 | B2 | 10/2008 | Lim |
| 7,479,949 | B2 | 1/2009 | Jobs et al. |
| 7,480,870 | B2 | 1/2009 | Anzures et al. |
| 7,657,849 | B2 | 2/2010 | Chaudhri et al. |
| 7,661,068 | B2 | 2/2010 | Lund |
| 7,698,127 | B2 | 4/2010 | Trower, II et al. |
| 7,793,225 | B2 | 9/2010 | Anzures et al. |
| 7,886,233 | B2 | 2/2011 | Rainisto et al. |
| 8,065,624 | B2 | 11/2011 | Morin et al. |
| 8,201,087 | B2 | 6/2012 | Kay et al. |
| 8,326,358 | B2* | 12/2012 | Runstedler et al. ........ 455/556.2 |
| 2002/0154037 | A1 | 10/2002 | Houston |
| 2002/0180797 | A1 | 12/2002 | Bachmann |
| 2004/0019786 | A1 | 1/2004 | Zorn et al. |
| 2004/0111475 | A1 | 6/2004 | Schultz |
| 2005/0017954 | A1 | 1/2005 | Kay et al. |
| 2005/0024341 | A1 | 2/2005 | Gillespie et al. |
| 2005/0039137 | A1 | 2/2005 | Bellwood et al. |
| 2005/0052425 | A1 | 3/2005 | Zadesky et al. |
| 2005/0060554 | A1 | 3/2005 | O'Donoghue |
| 2005/0093826 | A1 | 5/2005 | Huh |
| 2005/0162407 | A1 | 7/2005 | Sakurai et al. |
| 2006/0022947 | A1 | 2/2006 | Griffin et al. |
| 2006/0026521 | A1 | 2/2006 | Hotelling et al. |
| 2006/0107316 | A1 | 5/2006 | Fiske |
| 2006/0176283 | A1 | 8/2006 | Suraqui |
| 2006/0265648 | A1 | 11/2006 | Rainisto et al. |
| 2006/0265668 | A1 | 11/2006 | Rainisto |
| 2007/0046641 | A1 | 3/2007 | Lim |
| 2007/0061753 | A1 | 3/2007 | Ng et al. |
| 2007/0101151 | A1 | 5/2007 | Little et al. |
| 2007/0150842 | A1 | 6/2007 | Chaudhri et al. |
| 2007/0256029 | A1 | 11/2007 | Maxwell |
| 2007/0263932 | A1 | 11/2007 | Bernardin et al. |
| 2007/0271465 | A1 | 11/2007 | Wu |
| 2007/0271466 | A1 | 11/2007 | Mak et al. |
| 2008/0092216 | A1 | 4/2008 | Kawano et al. |
| 2008/0136587 | A1 | 6/2008 | Orr |
| 2008/0141125 | A1 | 6/2008 | Ghassabian |
| 2008/0158020 | A1 | 7/2008 | Griffin |
| 2008/0168353 | A1 | 7/2008 | Anzures et al. |
| 2008/0184360 | A1 | 7/2008 | Kornilovsky et al. |
| 2008/0189605 | A1 | 8/2008 | Kay et al. |
| 2008/0231610 | A1 | 9/2008 | Hotelling et al. |
| 2008/0259040 | A1 | 10/2008 | Ording et al. |
| 2008/0281583 | A1 | 11/2008 | Slothouber et al. |
| 2008/0304890 | A1 | 12/2008 | Shin et al. |
| 2008/0316183 | A1 | 12/2008 | Westerman et al. |
| 2008/0318635 | A1 | 12/2008 | Yoon et al. |
| 2009/0002326 | A1 | 1/2009 | Pihlaja |
| 2009/0006991 | A1 | 1/2009 | Lindberg et al. |
| 2009/0058823 | A1 | 3/2009 | Kocienda |
| 2009/0066668 | A1 | 3/2009 | Kim et al. |
| 2009/0077464 | A1 | 3/2009 | Goldsmith et al. |
| 2009/0085881 | A1 | 4/2009 | Keam |
| 2009/0125848 | A1 | 5/2009 | Keohane et al. |
| 2009/0132576 | A1 | 5/2009 | Miller et al. |
| 2009/0160800 | A1 | 6/2009 | Liu et al. |
| 2009/0167700 | A1 | 7/2009 | Westerman et al. |
| 2009/0227233 | A1 | 9/2009 | Yamashita et al. |
| 2009/0228792 | A1 | 9/2009 | Van Os et al. |
| 2009/0251410 | A1 | 10/2009 | Mori et al. |
| 2009/0259962 | A1 | 10/2009 | Beale |
| 2009/0265669 | A1 | 10/2009 | Kida et al. |
| 2009/0284479 | A1 | 11/2009 | Dennis et al. |
| 2009/0295737 | A1 | 12/2009 | Goldsmith et al. |
| 2009/0307768 | A1 | 12/2009 | Zhang et al. |
| 2009/0313693 | A1 | 12/2009 | Rogers |
| 2010/0052880 | A1 | 3/2010 | Laitinen |
| 2010/0070908 | A1 | 3/2010 | Mori et al. |
| 2010/0127991 | A1 | 5/2010 | Yee |
| 2010/0161538 | A1 | 6/2010 | Kennedy, Jr. et al. |
| 2010/0222095 | A1 | 9/2010 | Yamashita et al. |
| 2010/0292984 | A1 | 11/2010 | Huang et al. |
| 2011/0035696 | A1 | 2/2011 | Elazari et al. |

FOREIGN PATENT DOCUMENTS

| | | | |
|---|---|---|---|
| EP | 1942398 A1 | 7/2008 | |
| WO | 03/029950 A2 | 4/2003 | |
| WO | 03/054681 A1 | 7/2003 | |
| WO | 04/001560 A1 | 12/2003 | |
| WO | 2006/100509 A2 | 9/2006 | |
| WO | 2007/068505 A1 | 6/2007 | |
| WO | 2007/076210 A1 | 7/2007 | |
| WO | 2007/134433 A1 | 11/2007 | |
| WO | 2008030974 A1 | 3/2008 | |
| WO | 2008085741 A | 7/2008 | |

OTHER PUBLICATIONS

Extended European Search Report dated May 6, 2009, issued from the corresponding EP patent application No. 09151723.
Printout of "Features Included in the T-Mobile G1", retrieved from http://www.t-mobileg1.com/T-Mobile-G1-Features.pdf, 2009.
Chong et al., "Exploring the Use of Discrete Gestures for Authentication", IFIP International Federation for Information Processing, 2009.
iPhone User Guide—For iPhone OS 3.1 Software, 2009.
Madhvanath, Sriganesh, HP-Gesture based computing interfaces, Mar. 2008.
Printout of "T-Mobile Forum—Help & How to—Hidden Pattern", retrieved from http://forums.t-mobile.com/tmbl/board/message?board.id=Android3&message.id=3511&query.id=52231#M3511, Oct. 23, 2008.
Printout of "T-Mobile Forum—Help & How to—Screen Unlock Pattern", retrieved from http://forums.t-mobile.com/tmbl/board/message?board.id=Android3&message.id=6015&query.id=50827#M6015, Oct. 23, 2008.
Unknown Author, T-Mobile launches the highly anticipated T-Mobile G1, Oct. 22, 2008.

* cited by examiner

SYSTEM AND METHOD FOR ACCESS CONTROL IN A PORTABLE ELECTRONIC DEVICE

FIELD OF TECHNOLOGY

The present disclosure relates to access control, for example, for unlocking an electronic device or accessing features at an electronic device, using passcode protection.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and ease of portability. Smaller devices are generally desirable for portability and touch screen devices constructed of a display, such as a liquid crystal display, with a touch-sensitive overlay are useful on such handheld devices as such handheld devices are small and are therefore limited in space available for user input and output devices.

These devices may be used for storage of personal or confidential information and are easily lost or stolen given their portability. Therefore, it is useful to control access to such a device or to features on the device using passcode protection, for example. Passcodes set by typing alphanumeric characters, for example, are commonly long and cumbersome to enter in order to provide the desired level of security. These passcodes may be difficult to remember given their length or may be easy to guess. Other passcodes may be easy to break to gain access to the device.

Improvements in access control in electronic devices are therefore desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
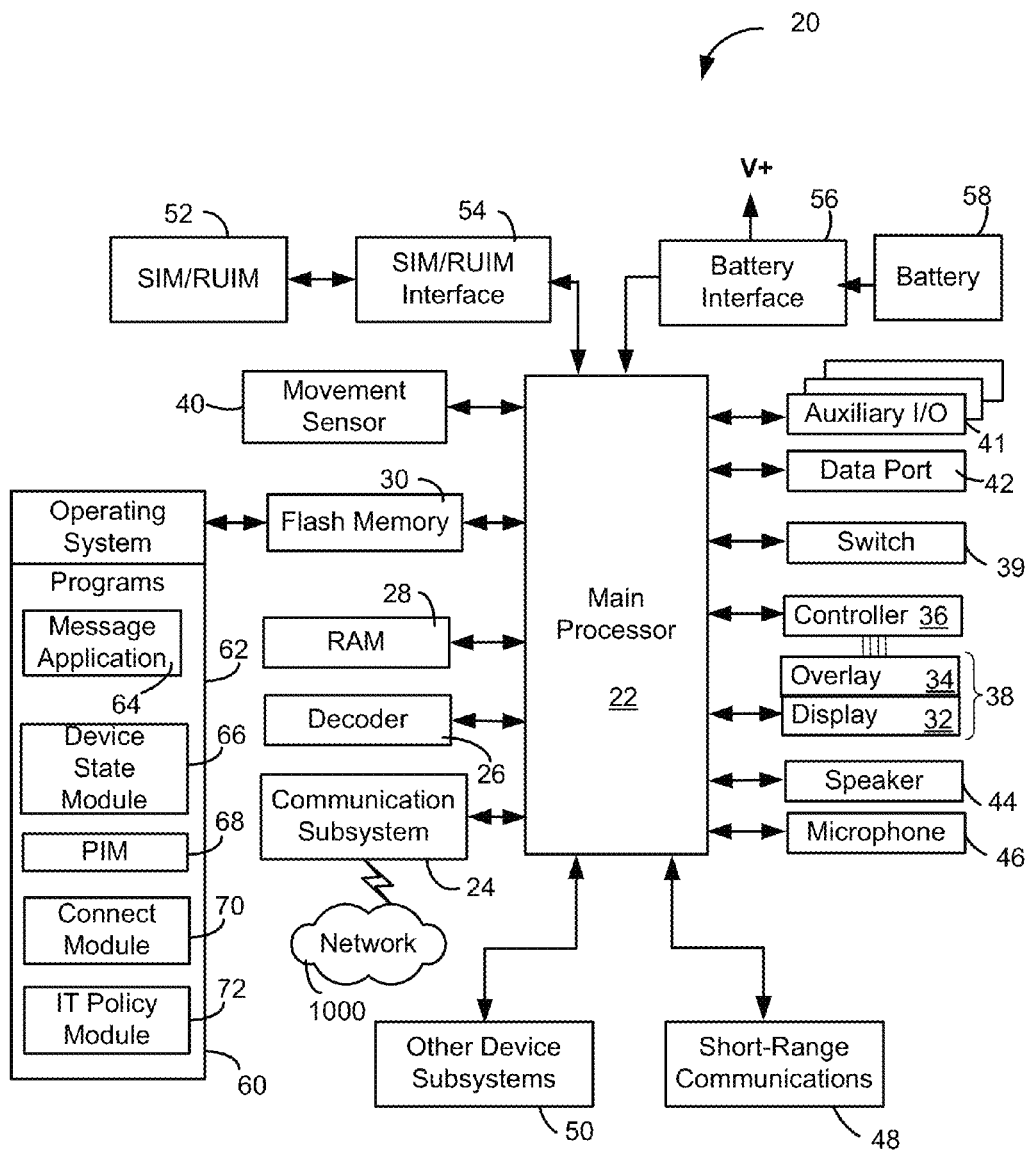
FIG. 1 is a simplified block diagram of components including internal components of a portable electronic device according an aspect of an embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Reference is first made to the Figures to describe an embodiment of a portable electronic and a method of access control in the electronic device. The method includes monitoring for input at the electronic device, for each input determined to be one of a plurality of predefined gestures including gestures from a touch-sensitive input device or from a movement sensor, mapping the input to a respective Unicode character and adding the respective Unicode character to a passcode to provide an entered passcode, comparing the entered passcode to a stored passcode, and changing an access state at the electronic device if the entered passcode matches the stored passcode.

Referring to FIG. 1, there is shown therein a block diagram of an example of an embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 can be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 1000. In this embodiment of the portable electronic device 20, the communication subsystem 24 is configured in accordance with the Global System for Mobile Communication (GSM) and General Packet Radio Services (GPRS) standards. The GSM/GPRS wireless network is used worldwide. New standards, such as Enhanced Data GSM Environment (EDGE) and Universal Mobile Telecommunications Service (UMTS) are believed to have similarities to the network behavior described herein, and it will also be understood by persons skilled in the art that the embodiments described herein are intended to use any other suitable standards that are developed in the future. The wireless link connecting the communication subsystem 24 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with the portable electronic device 20 is a GSM/GPRS wireless network in one example implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display 32 with a touch-sensitive overlay 34 connected to an electronic controller 36 that together make up a touch-sensitive display 38, a switch 39, a movement sensor 40, an auxiliary input/output (I/O) subsystem 41, a data port 42, a speaker 44, a microphone 46, short-range communications 48 and other device subsystems 50. The touch-sensitive overlay 34 and the display device 32 provide a touch-sensitive display 38 and the processor 22 interacts with the touch-sensitive overlay 34 via the electronic controller 36.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The movement sensor 40 detects movement of the portable electronic device to alternate orientations and the orientation of the portable electronic device 20 can therefore be determined. The movement sensor 40 can be an accelerometer that includes a cantilever beam with a proof mass and suitable deflection sensing circuitry. The accelerometer is used for detecting direction of gravitational forces (or gravity-induced reaction forces). Movement of the portable electronic device 20 to alternate orientations is detected and the orientation of the accelerometer and therefore of the portable electronic device 20 can be determined.

The portable electronic device 20 can send and receive communication signals over the wireless network 1000 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that can be used to identify a subscriber of the portable electronic device 20 and to personalize the portable electronic device 20, among other things. In the present embodiment the portable electronic device 20 is not fully operational for communication with the wireless network 1000 without the SIM/RUIM card 52. By inserting the SIM/RUIM card 52 into the SIM/RUIM interface 54, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 can include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information can also be programmed into the flash memory 30.

The portable electronic device 20 is a battery-powered device and includes a battery interface 56 for receiving one or more rechargeable batteries 58. In at least some embodiments, the battery 58 can be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 which are described in more detail below. The operating system 60 and the software components 62 that are executed by the processor 22 are typically stored in a persistent store such as the flash memory 30, which may alternatively be a read-only memory (ROM) or similar storage element (not shown). Those skilled in the art will appreciate that portions of the operating system 60 and the software components 62, such as specific software applications 64, 66, 68, 70 and 72, or parts thereof, may be temporarily loaded into a volatile store such as the RAM 28.

Other software components can also be included, as is well known to those skilled in the art.

The subset of software components 62 that control basic device operations, including data and voice communication applications, will normally be installed on the portable electronic device 20 during its manufacture. Other software applications include a message application 64 that can be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software components 62 can further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. The PIM 68 has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The software components 62 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that can be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 can be used to pass IT policy commands from the host system to the portable electronic device 20. This can be done in a wireless or wired manner. These instructions can then be passed to the IT policy module 72 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 1000, the auxiliary I/O subsystem 41, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 can be any suitable port that enables data communication between the portable electronic device 20 and another computing device. The data port 42 can be a serial or a parallel port. In some instances, the data port 42 can be a USB port that includes data lines for data transfer and a supply line that can provide a charging current to charge the battery 58 of the portable electronic device 20.

The short-range communications subsystem 48 provides for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 41. A subscriber may also compose data items, such as e-mail messages, for example, using the touch-sensitive overlay 34 on the display 32 that are part of the touch-sensitive display 38, and possibly the auxiliary I/O subsystem 41. The auxiliary I/O subsystem 41 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 is substantially similar, except that the received signals are output to the speaker 44, and signals for transmission are generated by the microphone 46. Alternative voice or audio I/O subsystems, such as a voice message recording subsystem, can also be implemented on the portable electronic device 20. Although voice or audio signal output is accomplished primarily through the speaker 44, the display 32 can also be used to provide additional information such as the identity of a calling party, duration of a voice call, or other voice call related information.

Figure 2:
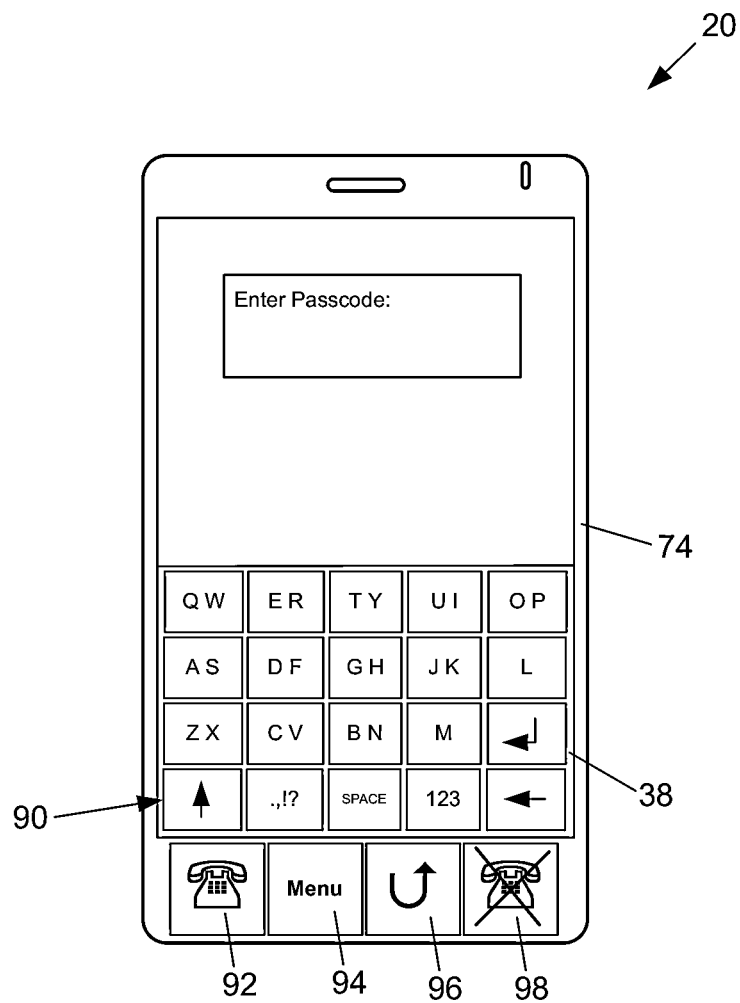
FIG. 2 is a front view of an example of a portable electronic device shown in portrait orientation.

Reference is now made to FIG. 2, which shows a front view of an example of a portable electronic device 20 in portrait orientation. The portable electronic device 20 includes a housing 74 that houses the internal components that are shown in FIG. 1 and frames the touch-sensitive display 38 such that the touch-sensitive display 38 is exposed for user-interaction therewith when the portable electronic device 20 is in use. In the example orientation shown in FIG. 2, the touch-sensitive display 38 includes a graphical user interface that in the present example includes a portrait mode virtual keyboard 90 having virtual keys for input of data in the form of linguistic elements such as alphanumeric characters or symbols, as well as input of commands such as delete or shift during operation of the portable electronic device 20. It will be appreciated that such a virtual keyboard may be used in access control in the portable electronic device 20, for example, for unlocking the portable electronic device 20 or for controlling access to features at the portable electronic device 20. The present disclosure is not limited to the portrait mode virtual keyboard 90 shown as other keyboards including other reduced keyboards or full keyboards are possible. Although the virtual keyboard 90 of the electronic device 20 shown in FIG. 2 is a reduced QWERTY keyboard, other keyboard layouts such as a full keyboard can be implemented. Further, other keyboard layouts such as AZERTY, DVORAK, or the like can also be contemplated by those skilled in the art.

Figure 3:
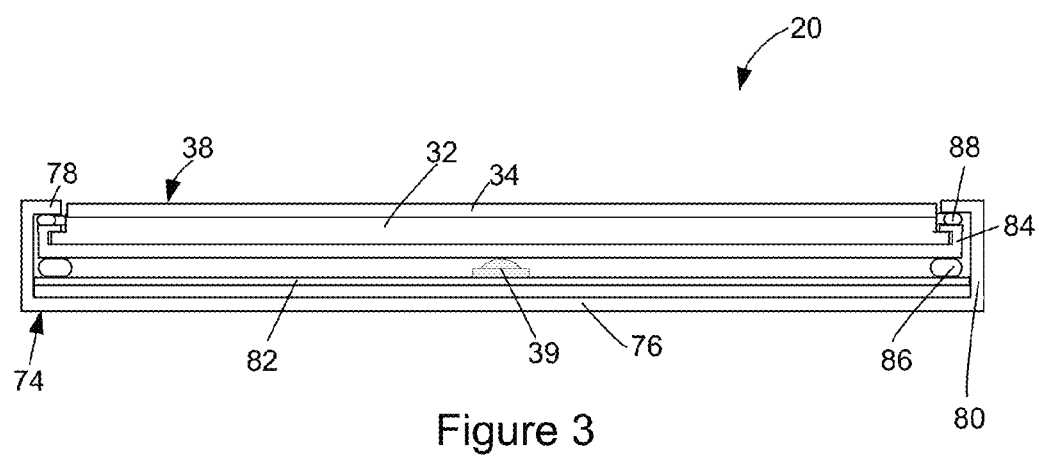
FIG. 3 is a simplified sectional side view of the portable electronic device of FIG. 2 (not to scale), with a switch shown in a rest state.

The housing can be any suitable housing for the internal components shown in FIG. 1. As best shown in FIG. 3, the housing 74 in the present example includes a back 76, a frame 78, which frames the touch-sensitive display 38, sidewalls 80 that extend between and generally perpendicular to the back 76 and the frame 78, and a base 82 that is spaced from and generally parallel to the back 76. The base 82 can be any suitable base and can include, for example, a printed circuit board or flex circuit board. The back 76 includes a plate (not shown) that is releasably attached for insertion and removal of, for example, the battery 58 and the SIM/RUIM card 52 described above. It will be appreciated that the back 76, the sidewalls 80 and the frame 78 can be injection molded, for example. In the example of the portable electronic device 20 shown in FIG. 2, the frame 78 is generally rectangular with rounded corners although other shapes are possible.

The display 32 and the touch-sensitive overlay 34 can be supported on a support tray 84 of suitable material such as magnesium for providing mechanical support to the display 32 and touch-sensitive overlay 34. The display 32 and touch-sensitive overlay 34 are biased away from the base 82, toward the frame 78 by biasing elements 86 such as gel pads between the support tray 84 and the base 82. Compliant spacers 88, which can also be in the form of gel pads for example, are located between an upper portion of the support tray 84 and the frame 78. The touch-sensitive display 38 is moveable within the housing 74 as the touch-sensitive display 38 can be moved toward the base 82, thereby compressing the biasing elements 86. The touch-sensitive display 38 can also be pivoted within the housing 74 with one side of the touch-sensitive display 38 moving toward the base 82, thereby compressing the biasing elements 86 on the same side of the touch-sensitive display 38 that moves toward the base 82.

In the present example, the switch 39 is supported on one side of the base 82 which can be a printed circuit board while the opposing side provides mechanical support and electrical connection for other components (not shown) of the portable electronic device 20. The switch 39 can be located between the base 82 and the support tray 84. The switch 39, which can be a mechanical dome-type switch, for example, can be located in any suitable position such that displacement of the touch-sensitive display 38 resulting from a user pressing the touch-sensitive display 38 with sufficient force to overcome the bias and to overcome the actuation force for the switch 39, collapses (or actuates) the switch 39. In the present embodiment the switch 39 is in contact with the support tray 84. Thus, depression of the touch-sensitive display 38 by user application of a force thereto causing actuation of the switch 39 thereby provides the user with positive tactile feedback during user interaction with the user interface of the portable electronic device 20. The switch 39 is not actuated in the rest state shown in FIG. 3, absent applied force by the user. Thus, withdrawal of the applied force on the touch-sensitive display 38 after actuation of the switch 39 causes release of the switch 39, returning to the rest state. It will now be appreciated that the switch 39 can be actuated by pressing anywhere on the exposed touch-sensitive display 38 to cause movement of the touch-sensitive display 38 in the form of movement parallel with the base 82 or pivoting of one side of the touch-sensitive display 38 toward the base 82. The switch 39 is connected to the processor 22 and can be used for further input to the processor when actuated or when released. Although a single switch is shown, any suitable number of switches can be used.

The touch-sensitive display 38 can be any suitable touch-sensitive display such as a capacitive touch-sensitive display. A capacitive touch-sensitive display 38 includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user resulting in a change in the electric field of each of the touch sensor layers. The signals represent the respective X and Y touch location values. It will be appreciated that other attributes of the user's touch on the touch-sensitive display 38 can be determined. For example, the size and the shape of the touch on the touch-sensitive display 38 can be determined in addition to the location (X and Y values) based on the signals received at the controller 36 from the touch sensor layers.

Referring again to FIG. 2, it will be appreciated that a user's touch on the touch-sensitive display 38 is determined by determining the X and Y touch location and user-selected input is determined based on the X and Y touch location and the application executed by the processor 22. In the example of the screen shown in the front view of FIG. 2, the application provides the virtual keyboard 90 and the button of the virtual keyboard 90 selected by the user is matched to the X and Y touch location. Thus, the button selected by the user is determined based on the X and Y touch location and the application. In the example shown in FIG. 2, the user enters text or any other characters via the virtual keyboard 90, selecting letters from the virtual keyboard 90 by touching the touch-sensitive display at the location of the characters on the virtual keyboard 90.

Defined gestures on the touch-sensitive display 38 can also be recognized using suitable gesture recognition techniques.

Such gestures may include, for example, a touch, a double touch, a pinching gesture in which two fingers touching the touch-sensitive display 38 are moved toward each other along the touch-sensitive display 38, an expanding gesture in which two fingers touching the touch-sensitive display 38 are moved away from each other along the touch-sensitive display 38, a sliding gesture or any other suitable gesture. Characteristics of each gesture can also be determined to distinguish between the gestures. Such characteristics can include, for example, the location and duration time of a touch, the location of a double touch, and the starting location and slide direction of a sliding gesture. Thus, for example, a slide from left to right on the touch-sensitive display 38 can be determined and distinguished from a slide from right to left on the touch-sensitive display 38. Each gesture is determined as a result of capacitive coupling with the touch sensor layers and an associated signal is provided to the application running at the time the gesture is received. A plurality of predefined gestures are possible and may be defined in software installed during manufacture of the portable electronic device 20.

In the present example, the portable electronic device includes four physical buttons 92, 94, 96, 98 in the housing 74 for user-selection for performing functions or operations including an "off-hook" button 92 for placing an outgoing cellular telephone call or receiving an incoming cellular telephone call, a Menu button 94 for displaying a context-sensitive menu or submenu, an escape button 96 for returning to a previous screen or exiting an application, and an "on-hook" button 98 for ending a cellular telephone call.

Figure 5:
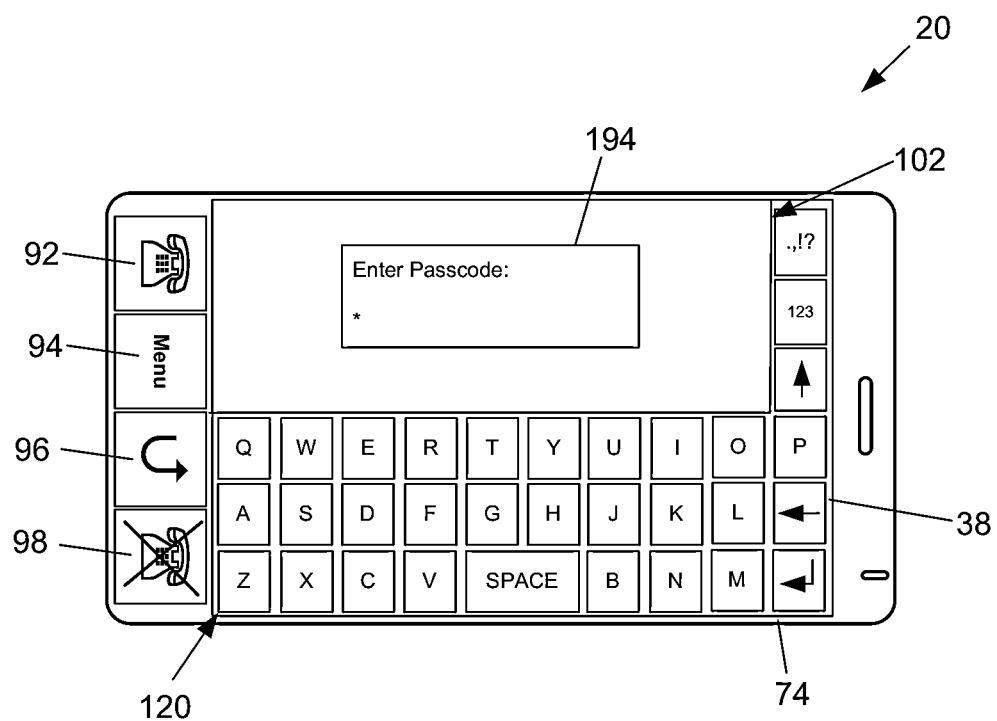
FIG. 5 is a front view of the example of the portable electronic device shown in a landscape orientation and illustrating an input in the method of access control.

As indicated above, the movement sensor 40 can be an accelerometer and is used for detecting direction of gravitational forces (or gravity-induced reaction forces). Movement of the portable electronic device 20 to alternate orientations is detected and the orientation of the movement sensor 40 and therefore of the portable electronic device 20 can be determined and an associated signal can be provided to the application running at the time the movement to the alternate orientation is detected. Thus a rotation from portrait orientation as shown in FIG. 2 to landscape orientation as shown in FIG. 5 can be detected and a signal is provided to the application running at the time the movement is detected. Similarly, a rotation from landscape orientation as shown in FIG. 5 to portrait orientation as shown in FIG. 2 can be detected and a signal provided to the application running at the time the movement is detected.

Figure 4:
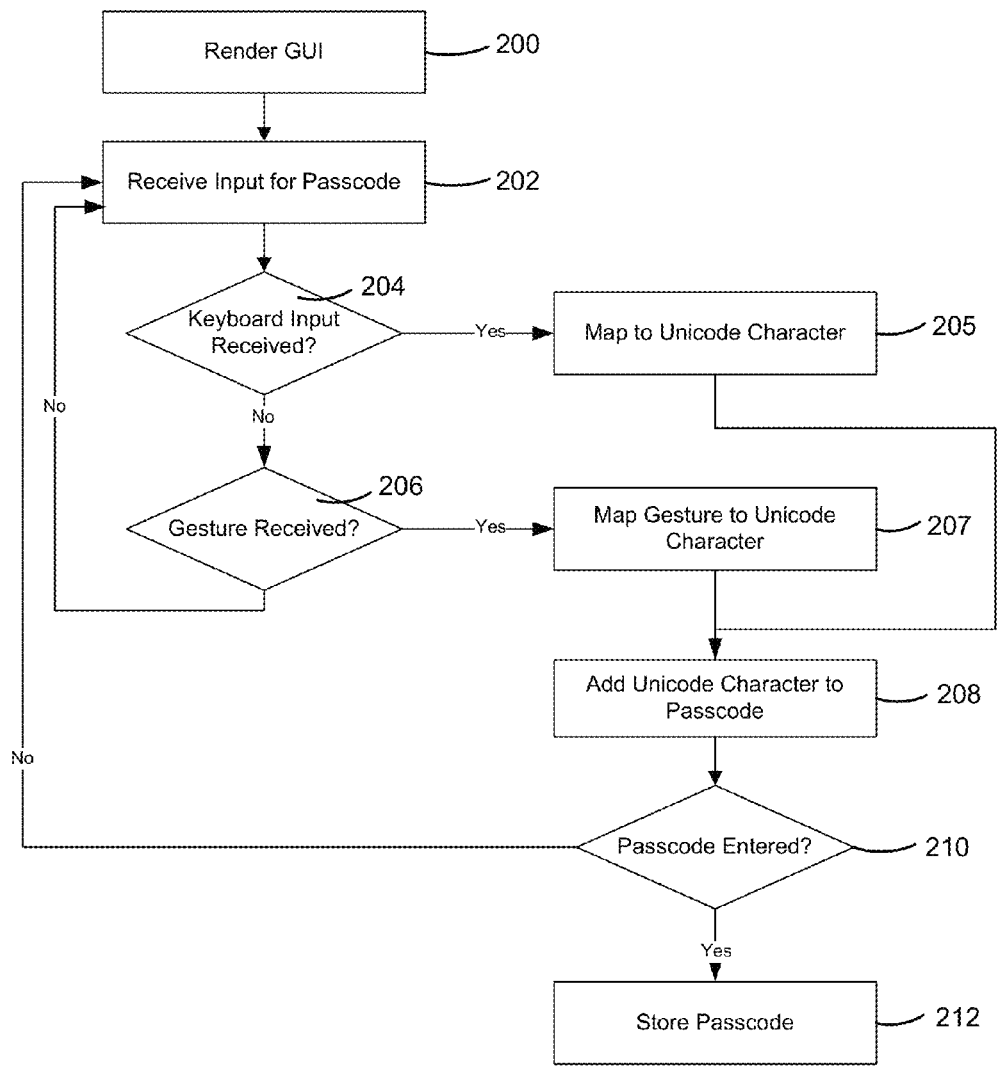
FIG. 4 is a flow chart illustrating a method of setting access control in an electronic device in accordance with an aspect of an embodiment.

A passcode for locking or unlocking the portable electronic device 20 can be entered as shown in FIG. 4. It will be appreciated that the steps of FIG. 4 are carried out by routines or subroutines of software executed by the processor 22. Coding of software for carrying out such steps is well within the scope of a person of ordinary skill in the art having regard to the present description.

The processor 22 executes a passcode setting routine or subroutine in an application for setting a passcode for access to applications or features on the portable electronic device 20 and a graphical user interface (GUI) is rendered for passcode entry (step 200). A passcode input is received at step 202. As understood herein, passcode input means input of a sequence of characters or gestures in a passcode field, with the possibility of addition, deletion, or correction of one or more inputted character or gesture. Accordingly, the passcode input can be a character selected from a keyboard 90 such as, for example, an alphanumeric character (lower or upper case) or a symbol. The passcode input can also be in the form of a gesture on the touch-sensitive display 38 or a gesture determined based on input from the movement sensor 40. As indicated above, a plurality of predefined gestures are possible.

Each of the predefined gestures is encoded with a respective Unicode character stored, for example, in a look-up table on the portable electronic device 20 and accessed by the processor 22 in the present method. The defined gestures are encoded with respective Unicode characters that are not otherwise used (not used for other character encodings). Any suitable Unicode format may be used. For example, UTF-8 or UTF-16 may be used.

The received input is processed and it is determined if the input is a keyboard input (selection of a keyboard character) (step 204). If so, the corresponding Unicode character is determined from the look-up table (step 205) and the method proceeds to step 208. If, the input is not a keyboard input, it is determined at step 206 if the input received from the touch-sensitive display 38 or the movement sensor 40 is a predefined gesture based on the signals received at the processor 22. If the input is a predefined gesture either from the touch-sensitive display 38 or the movement sensor 40, the gesture is determined and mapped to the respective Unicode character in the look-up table (step 207). The method then proceeds to step 208 where the Unicode character is added to a passcode stored in the RAM 28. If it is determined at step 206 that the input is not a predefined gesture, the method returns to step 202. Next, the passcode is either completed and the user confirms the entered passcode or the method returns to step 202 to receive the next input for the passcode. If a further input is received at step 202, it is again determined if the input is a keyboard input (step 204) and, if so, the character is mapped to the respective Unicode character (step 205) and the method proceeds to step 208. On the other hand if the input is not a keyboard input, it is determined if the input is a predefined gesture (step 206) and, if so, the gesture is mapped to the respective one of the Unicode characters (step 207). At step 208, the Unicode character is added to the passcode (step 208). When the passcode is entered, for example, by selection of a delimiter input such as a virtual enter button of the virtual keyboard 90 on the touch-sensitive display 38 or selection of a confirmatory icon, the entry is received (step 210) and the passcode is stored in the flash memory 30 at the portable electronic device 20 (step 212).

It will be appreciated that the process shown and described with reference to FIG. 4 is simplified for the purpose of the present explanation and other steps and substeps may be included. For example, rather than simply storing the passcode, upon entry, the user may be prompted to enter the passcode a second time and the second entry compared to the first to confirm the correct or intended passcode was entered. If the two passcodes differ, the method may return to step 202 to prompt the user to re-enter the passcode. It will also be appreciated that rules may be applied to the passcode entry and each passcode may be required to pass any suitable test or tests prior to acceptance. For example, a predefined minimum number of characters may be required for each passcode such that the passcode is not accepted and therefore not set if the passcode does not meet or exceed some threshold number of characters at the time confirmation of entry at step 210. It is also possible that, for example, at least one gesture (or any other suitable number of gestures) may be required for passcode acceptance. Thus, a passcode that includes only characters from the keyboard is not accepted.

Continued reference is made to FIG. 4 to describe one example of the method in accordance with an embodiment. The processor 22 receives a user-selection of an application or an option within an application for entry of a passcode for access to applications or features on the portable electronic device 20 and a graphical user interface (GUI) is rendered for passcode entry (step 200). In the present example, the passcode is a portable electronic device 22 passcode that is required to access any and all other applications on the portable electronic device 22. The passcode may be required after a user locks the device in any suitable manner such as selecting a lock option in an appropriate GUI or after a predetermined or preset period of time during which the portable electronic device 20 is not used.

A first passcode input is received at step 202. The input received can be a character selected from a keyboard such as, for example, an alphanumeric character (lower or upper case) or a symbol or can be in the form of a gesture on the touch-sensitive display 38 or a gesture determined based on input from the movement sensor 40. For the purpose of the present example, the user moves the portable electronic device 20, rotating clockwise from the portrait orientation shown in FIG. 2 to the landscape orientation shown in FIG. 5. The rotation from the portrait orientation to the landscape orientation is detected and an associated signal is provided from the movement sensor 40 to the processor 22. The signal is processed and it is determined that the input received is a predefined gesture at step 206 and not a keyboard input (step 204).

The rotation shown is a predefined gesture in the present example and the predefined gesture of rotating from the portrait orientation shown in FIG. 2 to the landscape orientation shown in FIG. 5 is encoded with a respective Unicode character. This corresponding Unicode character is determined from the look-up table stored in the flash memory 30 at the portable electronic device 20 by matching the captured gesture to the respective Unicode character (step 207).

For the purpose of the present example, the rotation of the portable electronic device 20 also causes a landscape mode keyboard 110 to be displayed for use in the landscape orientation.

The Unicode character is then added to the passcode temporarily stored in the RAM 28 (step 208).

Figure 6:
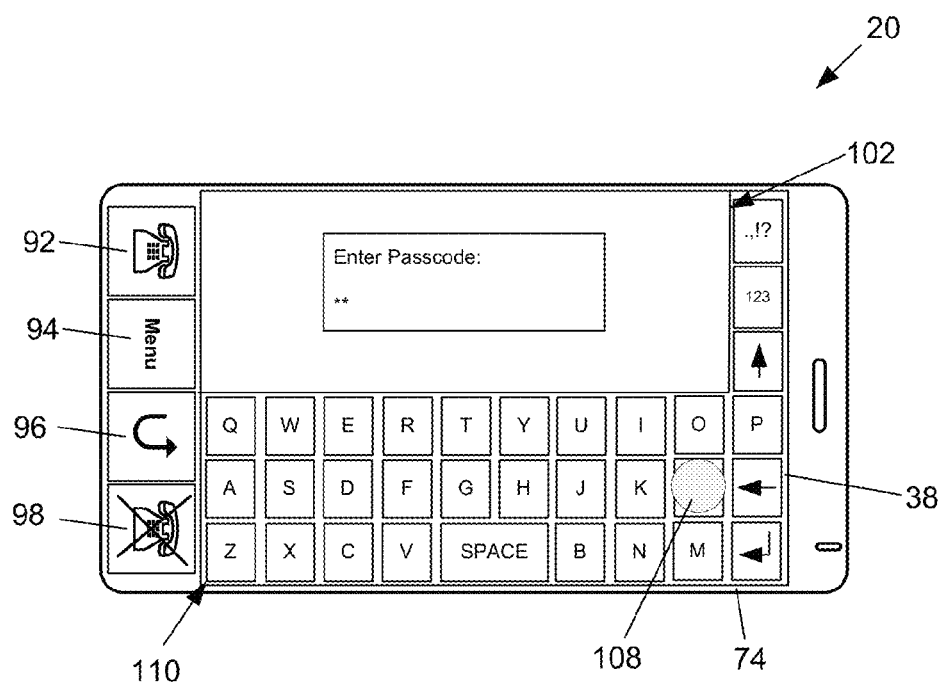
FIG. 6 is a front view of the example of the portable electronic device shown in a landscape orientation and illustrating an input in the method of access control.

In the present example, the user continues to enter the passcode and therefore the passcode is not entered at step 210 and a further input is received at step 202 where a second passcode input is received. Again, the input received can be a character selected from a keyboard such as, for example, an alphanumeric character (lower or upper case) or a symbol or can be in the form of a gesture on the touch-sensitive display 38 or a gesture determined based on input from the movement sensor 40. For the purpose of the present example, the user selects a character from the virtual keyboard 90 on the touch-sensitive display 38. The character selected is the letter "L" as illustrated by the touch location 108 shown in FIG. 6 and the processor 22 determines that the "L" is selected based on the X and Y location of the touch on the touch-sensitive display and the application running at the time of the touch. It is determined that the character "L" is a character (step 204), the corresponding Unicode character is determined (step 205) and the Unicode character for the letter "L" is then added to a passcode that is temporarily stored in the RAM 28 (step 208).

Figure 7:
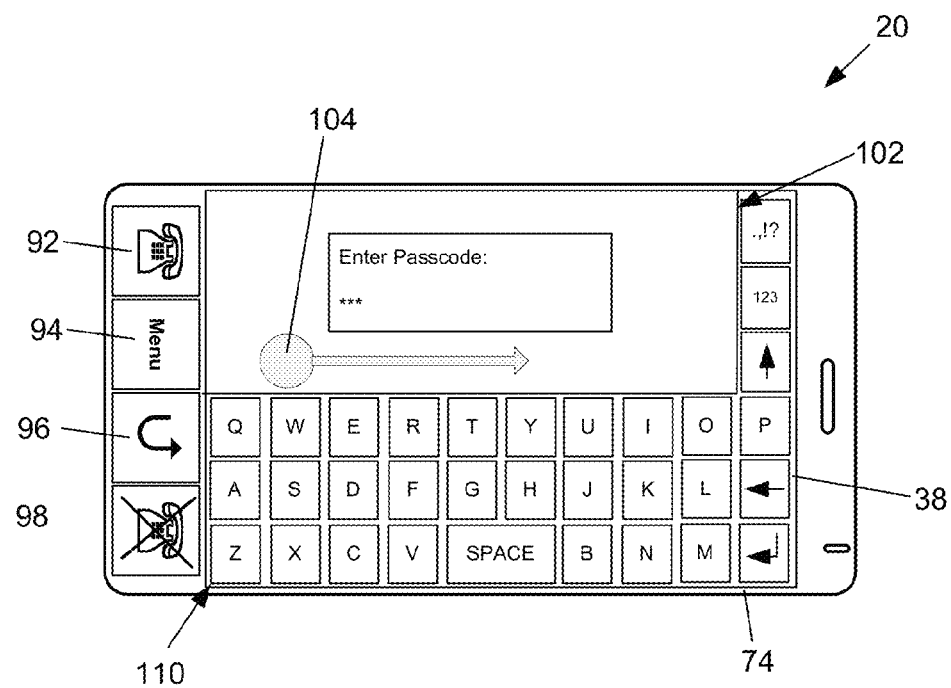
FIG. 7 is a front view of the example of the portable electronic device shown in the landscape orientation and illustrating another input in the method of access control.

In the present example, the user continues to enter the passcode and therefore the passcode is not entered at step 210 and a further input is received at step 202 where a third passcode input is received. Yet again, the input received can be a character selected from a keyboard such as, for example, an alphanumeric character (lower or upper case) or a symbol or can be in the form of a gesture on the touch-sensitive display 38 or a gesture determined based on input from the movement sensor 40. For the purpose of the present example, the user touches the touch-sensitive display 38 at a display area 102 at the point indicated generally by the numeral 104 and slides the finger from the initial contact location toward the right, as shown in FIG. 7. The sliding gesture from left to right is determined based on the signals received from the touch-sensitive display 38 via the controller 36 and processing of the signals at the processor 22. It is therefore determined that the input is not a keyboard input (step 204). Instead, it is determined at step 206 that the input is a predefined gesture.

The sliding gesture from left to right is a predefined gesture in the present example and the predefined gesture is encoded with a respective Unicode character. The Unicode character is determined from the look-up table stored in the flash memory 30 at the portable electronic device 20 by matching the captured gesture to the respective Unicode character (step 207).

The Unicode character is then added to the passcode temporarily stored in the RAM 28 (step 208).

Figure 8:
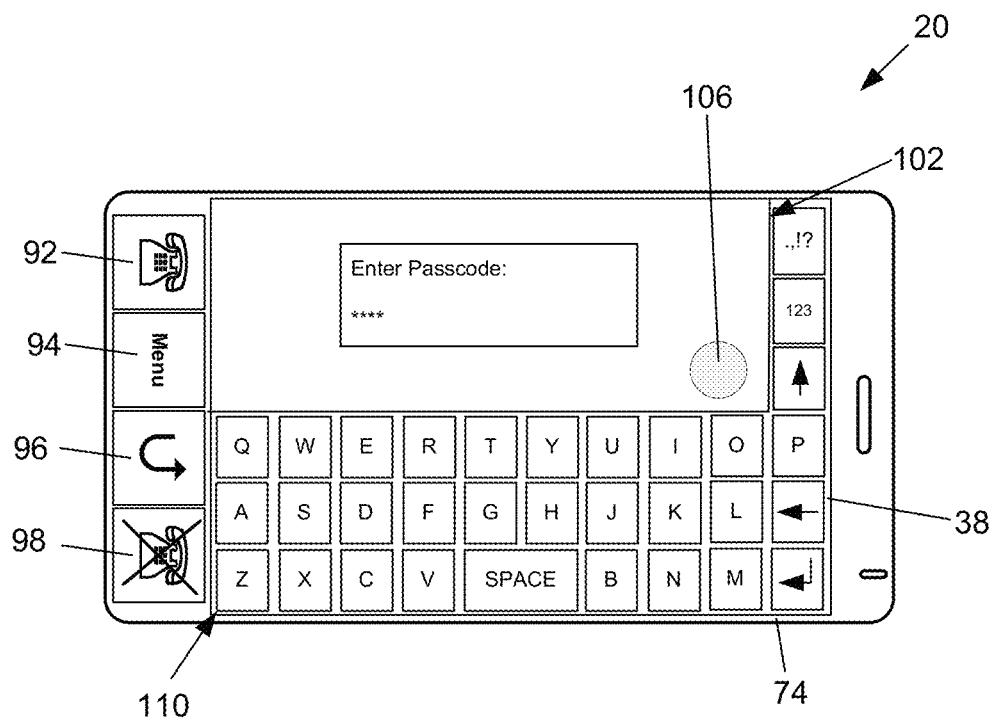
FIG. 8 is a front view of the example of the portable electronic device shown in the landscape orientation and illustrating yet another input in the method of access control.

In the present example, the user continues to enter the passcode and therefore the passcode is not entered at step 210 and a further input is received at step 202 where a fourth passcode input is received. For the purpose of the present example, the touches the touch-sensitive display 38 at a display area 102 and maintains contact for about 3 seconds at the point indicated generally by the numeral 106, as shown in FIG. 8. The touch contact and maintaining the touch is determined based on the signals received from the touch-sensitive display 38 via the controller 36 and processing of the signals at the processor 22. The input is not a keyboard input (step 204). It is therefore determined at step 206 that the input is a predefined gesture. It will be appreciated that a touch maintained on the touch-sensitive display 38 for some threshold period of time may be captured as a predefined gesture, therefore differing from a touch that is not maintained for the threshold period of time.

The touch that is maintained for a threshold period time is a predefined gesture in the present example and the predefined gesture is encoded with a respective Unicode character. The Unicode character is determined from the look-up table stored in the flash memory 30 at the portable electronic device 20 by matching the captured gesture to the respective Unicode character (step 207).

The Unicode character is then added to the passcode temporarily stored in the RAM 28 (step 208).

For the purpose of the present example, the passcode that is entered is confirmed, for example, by selection of a virtual enter button of the virtual keyboard 90 on the touch-sensitive display 38. The confirmation is determined at the processor based on input from the touch-sensitive display 38 via the controller 36 (step 210) and the passcode is stored in the flash memory 30 at the portable electronic device 20 (step 212).

The passcode is therefore set and is used for restricting access to applications or features on the portable electronic device 20. The portable electronic device 20 can then be locked and only unlocked upon entry of the correct passcode. Therefore, the passcode is required for access to any and all other applications on the portable electronic device 22 and the portable electronic device 20 can be locked by selecting a lock option in an appropriate GUI or after a predetermined or preset period of time during which the portable electronic device 20 is not used.

Figure 9:
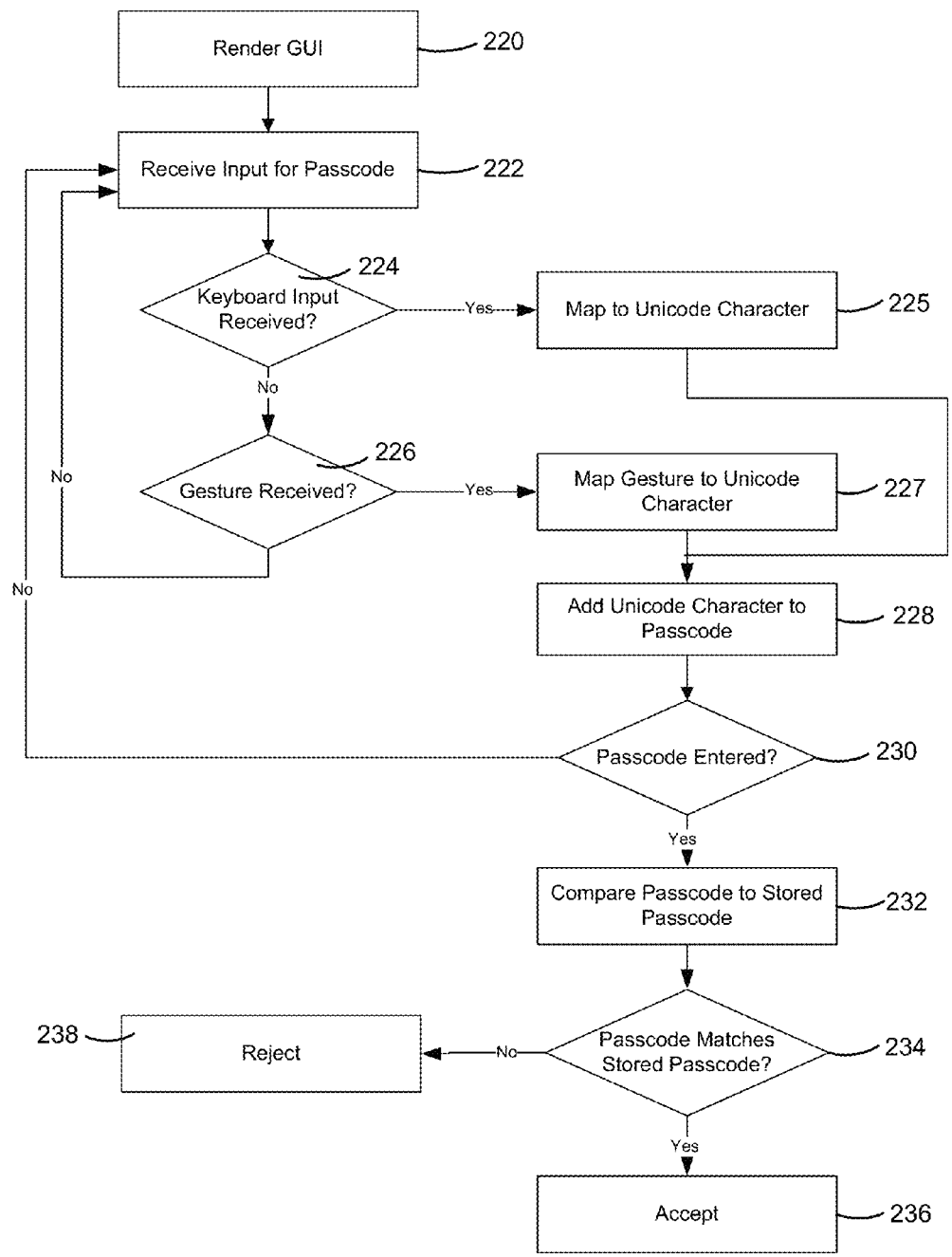
FIG. 9 is a flow chart illustrating a method of access control in an electronic device in accordance with an aspect of an embodiment.

Reference is now made to FIG. 9 to describe a method of access control in the portable electronic device 20 in accordance with an aspect of an embodiment. It will be appreciated that the steps of FIG. 9 are carried out by routines or subroutines of software executed by the processor 22. Coding of software for carrying out such steps is well within the scope of a person of ordinary skill in the art having regard to the present description.

The processor 22 performs an unlocking routine or subroutine in an application for entry of a passcode to access to applications or features on the portable electronic device 20 and a graphical user interface (GUI) is rendered for passcode entry (step 220). The processor 20 therefore monitors the input devices including the touch-sensitive display 38 and the movement sensor 40 for input. A passcode input is received at step 222. The passcode input can be a character selected from a keyboard such as, for example, an alphanumeric character (lower or upper case) or a symbol. The passcode input can also be in the form of a gesture on the touch-sensitive display 38 or a gesture determined based on input from the movement sensor 40. As indicated above, a plurality of predefined gestures are possible.

At step 224, it is determined if the input received at step 222 is an input from the keyboard 90 at the portable electronic device 20 and, if so, the keyboard input is mapped to the respective Unicode character (step 225) and the method proceeds to step 228. On the other hand, if the input is not a keyboard input, it is determined at step 226 if the input received at step 222 is a predefined gesture captured from the touch-sensitive display 38 or the movement sensor 40 based on the signals received at the processor 22. The received input is processed and if the input is determined to be a predefined gesture, either from the touch-sensitive display 38 or the movement sensor 40, the gesture is mapped to the respective Unicode character in the look-up table (step 227). The method then proceeds to step 228. If it is determined at step 206 that the input is not a predefined gesture, the method returns to step 222. At step 228, the respective Unicode character is added to a passcode stored in the RAM 28. Next, the passcode entry is either entered or the method returns to step 222 to receive the next input for the passcode. If a further input is received at step 222, it is again determined if the input is a keyboard input (step 224) and if so, the keyboard input is mapped to the respective Unicode character. If the input is not a keyboard input, it is then determined if the input is a predefined gesture. If the input is determined to be a predefined gesture (step 226), the gesture is mapped to the respective one of the Unicode characters (step 227). Otherwise, the method returns to step 222. The respective Unicode character is added to the passcode (step 228). When the passcode that is inputted is entered, for example, by selection of a virtual enter button of the virtual keyboard 90 on the touch-sensitive display 38, the entry confirmation is received (step 230) and the passcode inputted and entered at step 230 is compared to the previously set passcode stored in the flash memory 30 at the portable electronic device 20 (step 232). Thus, each of the characters of the passcode entered at step 230 is compared to the respective character, based on the order of characters, in the previously set passcode.

If the passcode that was inputted and entered is determined to match the previously set passcode (step 234), the passcode is accepted and the access state of the portable electronic device 20 is changed (step 236). If, on the other hand the passcode at step 230 is determined not to match the previously set passcode, the passcode is rejected (step 238).

It will be appreciated that the process shown and described with reference to FIG. 9 is also simplified for the purpose of the present explanation and other steps and substeps may be included. For example, if the passcode is rejected at step 238, the method may return to step 222. A count of rejected password entries can also be maintained during an attempt to unlock the portable electronic device 20 and the device 20 may restrict the number of attempts to a suitable predefined number of attempts after which the portable electronic device 20 may time out, may erase content, or may take any other suitable action.

Continued reference is made to FIG. 9 to describe a method of access control in the portable electronic device 20 in accordance with an aspect of an embodiment. It will be appreciated that the steps of FIG. 9 are carried out by routines or subroutines of software executed by the processor 22. Coding of software for carrying out such steps is well within the scope of a person of ordinary skill in the art having regard to the present description.

The portable electronic device 20 is locked and is unlocked by entry of the correct passcode for access to any and all other applications on the portable electronic device 22 and the portable electronic device 20. In the present example, the passcode is a portable electronic device 22 passcode that is required to access any and all other applications on the portable electronic device 22. The passcode may be required after a user locks the device in any suitable manner such as selecting a lock option in an appropriate GUI or after a predetermined or preset period of time during which the portable electronic device 20 is not used. In other example embodiments, a passcode is required to access a feature or an application of the portable electronic device 20, such as the PIM 68.

The processor 22 enters an unlocking routine or subroutine to access applications or features on the portable electronic device 20 and a graphical user interface (GUI) is rendered for passcode entry (step 220). The GUI therefore prompts the user to input and enter the passcode for access, for example, when a user touches any input such as one of the four physical buttons 92, 94, 96, 98 or the touch-sensitive display 38. The processor 20 then monitors the input devices including the touch-sensitive display 38 and the movement sensor for input of the passcode. It will now be appreciated that the input received can be a character selected from a keyboard such as, for example, an alphanumeric character (lower or upper case) or a symbol or can be in the form of a gesture on the touch-sensitive display 38 or a gesture determined based on input from the movement sensor 40. Many of the steps of the present method are similar to those described above and therefore will not be described again in detail. Each passcode input is therefore received and the respective Unicode character is added to the passcode until the full passcode is entered (steps 222 to 228).

When the passcode inputted is entered, for example, by selection of a virtual enter button of the virtual keyboard 90 on the touch-sensitive display 38, the entry is received (step 230) and the passcode at step 230 is compared to the previously set passcode stored in the flash memory 30 at step 212 of FIG. 4 (step 232). Thus, each of the characters of the passcode entered at step 230 is compared to the respective character, based on the order of characters, in the previously set passcode such that the first character of the entered passcode is compared to the first character of the previously set passcode. Similarly, the second character of the entered passcode is compared to the second character of the previously set passcode. This comparison is made for each of the characters of the passcode until, either the characters are determined not to match or until all of the characters are compared and determined to match.

If the passcode entered at step 230 is determined to match the previously set passcode (step 234), the passcode is accepted and the access state at the portable electronic device 20 is changed as access to the other applications features of the portable electronic device 20 is permitted.

If, on the other hand the passcode entered and confirmed at step 230 is determined not to match the previously set passcode, the passcode is rejected and access to the other applications and features of the portable electronic device is denied.

Figure 10:
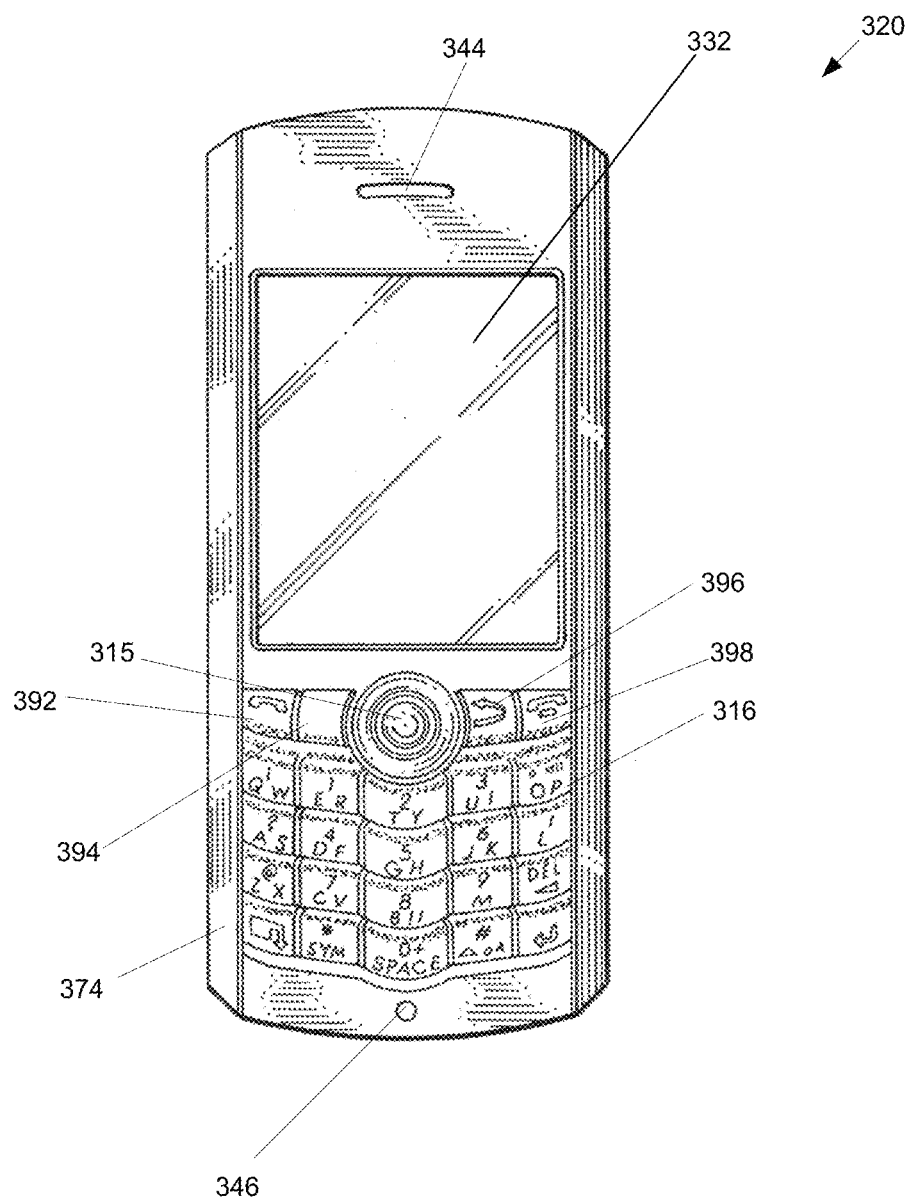
FIG. 10 is a front view of another example of a portable electronic device.

It will be appreciated that the present disclosure is not limited to the portable electronic device 20 shown and many other portable electronic devices are possible. For example, the portable electronic device may have any suitable keyboard separate of the touch-sensitive display 38. Further, many other keyboard types are possible including, for example, other reduced keyboards or other full keyboards in either of the orientations shown. Reference is now made to FIG. 10 which shows another example of a portable electronic device 320. The portable electronic device 320 includes a housing 374 that frames the display 332, the speaker 344, a trackball 315, a keyboard 316, and the microphone 346. The trackball 315 can be rolled within a socket for user-input and can be inwardly depressed as a means for providing additional user-input, for example, for entry of the passcode after the passcode is input at the portable electronic device 320. The keyboard 316 includes input keys associated with commands such as an exit key 372, a menu key 374, an initiate call key 376 and an end call key 378 as well as input keys associated with alphanumeric characters corresponding to Unicode characters. In the present example, the portable electronic device 320 includes a movement sensor such as an accelerometer for detecting movement of the portable electronic device 320. A processor (not shown) can execute the passcode setting routine or subroutine in an application for setting a passcode for access to applications or features on the portable electronic device 320 as described herein with reference to FIG. 4. In the present example, the portable electronic device 320 includes the movement sensor for gesture input. The portable electronic device 320, however, does not include a touch-sensitive display 38. Thus, gestures are received from the movement sensor in the method of access control in the portable electronic device 320. Keyboard input in the portable electronic device 320 is from the physical keys of the keyboard 316. The processor can further perform an unlocking routine or subroutine in an application for entry of a passcode to access to applications or features on the portable electronic device 320 as described herein with reference to FIG. 9. Again, the portable electronic device 320 includes the movement sensor for gesture input and therefore gestures are received from the movement sensor in the method of access control in the portable electronic device 320. In other embodiments, a touch-sensitive overlay can be included to provide a touch-sensitive display. In still other embodiments gestures can be received from a trackball for use in the method of access control.

In embodiments, the movement sensor is an accelerometer as described above. In other embodiments, the movement senor is a gyroscope.

According to one aspect, there is provided a method of access control in an electronic device that includes monitoring for input at the electronic device, for each input determined to be one of a plurality of predefined gestures, mapping the input to a respective Unicode character and adding the respective Unicode character to a passcode to provide an entered passcode, comparing the entered passcode to a stored passcode, and changing an access state at the electronic device if the entered passcode matches the stored passcode.

According to another aspect, an electronic device is provided. The portable electronic device includes a housing and input devices including a touch-sensitive input device exposed by the housing. Functional components are housed in the housing including a memory and a processor operably connected to the touch-sensitive input device and the memory for executing a program stored in the memory to cause the electronic device to monitor the input devices for input, for each input determined to be one of a plurality of predefined gestures including gestures from a touch-sensitive input device or from a movement sensor, map the input to a respective Unicode character and add the respective Unicode character to a passcode comprising Unicode characters to provide an entered passcode, compare the entered passcode to a stored passcode, and change access at the electronic device if the entered passcode matches the stored passcode.

According to another aspect, there is provided an electronic device having a housing and input devices including a virtual keyboard presented on a display of the electronic device. The virtual keyboard has virtual keys associated with commands or linguistic elements such as alphanumeric characters corresponding to Unicode characters. Functional components are located in the housing including a memory and a processor operably connected to the keyboard and the memory for executing a program stored in the memory to cause the electronic device to monitor the input devices for input such as Unicode characters input from the virtual keyboard or gestures, and for each input determined to be one of a plurality of predefined gestures including gestures from a movement sensor, map the input to a respective Unicode character and add the respective Unicode character to a passcode comprising Unicode characters to provide an entered passcode, compare the entered passcode to a stored passcode, and change access at the electronic device if the entered passcode matches the stored passcode.

According to another aspect, there is provided an electronic device having a housing and input devices including a keyboard having keys associated with commands or linguistic elements such as alphanumeric characters corresponding to Unicode characters. Functional components are located in the housing including a memory and a processor operably connected to the keyboard and the memory for executing a program stored in the memory to cause the electronic device to monitor the input devices for input such as Unicode characters input from the keyboard or gestures, and for each input determined to be one of a plurality of predefined gestures including gestures from a movement sensor, map the input to a respective Unicode character and add the respective Unicode character to a passcode comprising Unicode characters to provide an entered passcode, compare the entered passcode to a stored passcode, and change access at the electronic device if the entered passcode matches the stored passcode.

According to yet another aspect, there is provided a computer-readable medium having computer-readable code embodied therein for execution by a processor in an electronic device for monitoring for input at the electronic device; for each input determined to be one of a plurality of predefined gestures, mapping the input to a respective Unicode character and adding the respective Unicode character to a passcode to provide an entered passcode, comparing the entered passcode to a stored passcode, and changing an access state at the electronic device if the entered passcode matches the stored passcode.

Advantageously, a number of predefined gestures may be used in defining and in entering a passcode. The gestures can be mapped to Unicode characters that can not be typed using a standard keyboard, for example. These gestures can include gestures on a touch-sensitive input such as a touch-sensitive display and can include, for example, a touch and different characteristics including location of touch and time of contact of the touch can be used to map to a particular Unicode character. A slide along the touch-sensitive input surface can also be determined and characteristics such as starting location and slide direction can be used to map the gesture to a particular Unicode character. Similarly, gestures detected at a movement sensor such as, for example, an accelerometer, can be used to map the input from the to a Unicode character. Such gestures can include determination of rotation of the electronic device and the direction of rotation. Thus, a number of defined actions can be mapped to Unicode characters that are used as input in a passcode. These actions can be mixed with predefined actions or with input from, for example, a keyboard that may be a virtual keyboard on a touch-sensitive display or may be a physical keyboard. The combination of various predefined gestures from the touch-sensitive display and the movement sensor such as an accelerometer with characters selected from a keyboard or keypad in a passcode permits the use of relatively short passcodes that are difficult to break.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

The invention claimed is:

1. A method of access control in an electronic device, the method comprising:
   receiving input at the electronic device;
   when the input is received from a key of a keyboard, identifying a Unicode character that is associated with the key and adding the Unicode character that is associated with the key to a passcode;
   when the input is a gesture, identifying a Unicode character that is unused for any other character encoding and that cannot be typed using the keyboard, and adding the Unicode character that is unused for any other character encoding and that cannot be typed using the keyboard to the passcode; and
   determining whether the passcode matches a previously set passcode that includes the Unicode character that is unused for any other character encoding and that cannot be typed using the keyboard; and
   changing an access state at the electronic device when the passcode matches the previously set passcode.

2. The method according to claim 1, wherein identifying a Unicode character that is associated with the key comprises mapping the input to the Unicode character.

3. The method according to claim 1, wherein the keyboard comprises a virtual keyboard displayed on the touch-sensitive display on the electronic device.

4. The method according to claim 1, wherein the gesture comprises a gesture from a movement sensor.

5. The method according to claim 1, wherein the gesture comprises one of a plurality of predefined gestures at a touch-sensitive input device.

6. The method according to claim 1, wherein the gesture comprises at least one of a touch at a location on the touch-sensitive input device, a finger slide in a direction along the touch-sensitive input device, a touch maintained at a location on the touch-sensitive input device for a threshold period of time, a pinching gesture along the touch-sensitive input device, or an expanding gesture along the touch-sensitive input device.

7. The method according to claim 1, wherein the gesture comprises rotation of the electronic device.

8. The method according to claim 1, comprising receiving confirmation of entry of the passcode and comparing the passcode to the previously set passcode.

9. The method according to claim 1, comprising rejecting the passcode when the passcode fails to match the previously set passcode.

10. The method according to claim 1, wherein the gesture comprises a gesture on a touch-sensitive display.

11. The method according to claim 1, wherein changing an access state at the electronic device comprises permitting access to an application at the electronic device.

12. An electronic device comprising:
    input devices, a memory and a processor coupled to the input devices and the memory to execute a program stored in the memory to cause the electronic device to:
    receive input from the input devices,
    when the input is received from a key of a keyboard, identify a Unicode character that is associated with the key and adding the Unicode character that is associated with the key to a passcode;
    when the input is a gesture, identify a Unicode character that is unused for any other character encoding and that cannot be typed using the keyboard, and adding the Unicode character that is unused for any other character encoding and that cannot be typed using the keyboard to the passcode; and
    determine whether the passcode matches a previously set passcode that includes the Unicode character that is unused for any other character encoding and that cannot be typed using the keyboard;
    change an access state at the electronic device when the passcode matches the previously set passcode.

13. The electronic device according to claim 12, wherein the input devices include a touch-sensitive input device.

14. The electronic device according to claim 13, wherein the touch-sensitive input device comprises a touch-sensitive display.

15. The electronic device according to claim 12, wherein the gesture comprises one of a plurality of predefined gestures at a touch-sensitive input device.

16. The electronic device according to claim 15, wherein the gesture comprises at least one of a touch at a location on the touch-sensitive input device, a finger slide in a direction along the touch-sensitive input device, a touch maintained at a location on the touch-sensitive input device for a threshold period of time, a pinching gesture along the touch-sensitive input device, or an expanding gesture along the touch-sensitive input device.

17. The electronic device according to claim 12, wherein the input devices comprise a movement sensor that comprises one of an accelerometer or a gyroscope.

18. The electronic device according to claim 17, wherein a gesture from the movement sensor comprises rotation of the electronic device.

19. A non-transitory computer-readable medium having computer-readable code stored thereon, the computer-readable code executable by at least one processor of an electronic device to:
    receive input;
    when the input is received from a key of a keyboard, identify a Unicode character that is associated with the key and add the Unicode character that is associated with the key to a passcode;
    when the input is a gesture, identify a Unicode character that is unused for any other character encoding and that cannot be typed using the keyboard, and add the Unicode character that is unused for any other character encoding and that cannot be typed using the keyboard to the passcode;

determine whether the passcode matches a previously set passcode that includes the Unicode character that is unused for any other character encoding and that cannot be typed using the keyboard; and change an access state at the electronic device when the passcode matches the previously set passcode.

* * * * *